United States Patent
Park et al.

(10) Patent No.: US 11,442,774 B2
(45) Date of Patent: Sep. 13, 2022

(54) SCHEDULING TASKS BASED ON CALCULATED PROCESSOR PERFORMANCE EFFICIENCIES

(71) Applicant: Samsung Electronics Co., Ltd., Suwon-si (KR)

(72) Inventors: Bum Gyu Park, Suwon-si (KR); Jong-Lae Park, Anyang-si (KR); Lak-Kyung Jung, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 63 days.

(21) Appl. No.: 16/823,469

(22) Filed: Mar. 19, 2020

(65) Prior Publication Data

US 2021/0042153 A1 Feb. 11, 2021

(30) Foreign Application Priority Data

Aug. 5, 2019 (KR) .................. 10-2019-0094799

(51) Int. Cl.
| | |
|---|---|
| *G06F 9/48* | (2006.01) |
| *G06F 11/30* | (2006.01) |
| *G06F 11/34* | (2006.01) |
| *G06F 9/50* | (2006.01) |

(52) U.S. Cl.
CPC .......... *G06F 9/4881* (2013.01); *G06F 9/5038* (2013.01); *G06F 11/3006* (2013.01); *G06F 11/3409* (2013.01)

(58) Field of Classification Search
CPC .............. G06F 9/4881; G06F 11/3006; G06F 11/3409; G06F 9/5038; G06F 9/4893
See application file for complete search history.

(56) References Cited

U.S. PATENT DOCUMENTS

| | | | |
|---|---|---|---|
| 7,254,812 B1 | 8/2007 | Menezes | |
| 8,381,004 B2 | 2/2013 | Elnozahy et al. | |
| 8,527,997 B2 | 9/2013 | Bell, Jr. et al. | |
| 8,689,220 B2 | 4/2014 | Prabhakar et al. | |
| 8,739,165 B2 | 5/2014 | Russell et al. | |
| 9,164,566 B2 | 10/2015 | Ghose | |
| 9,189,273 B2 | 11/2015 | Brochard et al. | |
| 9,195,515 B1* | 11/2015 | Butterworth | G06F 9/5094 |
| 9,842,040 B2* | 12/2017 | Kruglick | G06F 9/5044 |
| 10,162,397 B2* | 12/2018 | Matteson | G06F 1/3209 |
| 2002/0091954 A1* | 7/2002 | Rhee | G06F 9/5044 |
| | | | 713/320 |
| 2012/0192200 A1 | 7/2012 | Rao et al. | |
| 2013/0205126 A1* | 8/2013 | Kruglick | G06F 1/3296 |
| | | | 713/1 |
| 2014/0281609 A1* | 9/2014 | Hanumaiah | G06F 1/3296 |
| | | | 713/320 |

(Continued)

*Primary Examiner* — Benjamin C Wu
(74) *Attorney, Agent, or Firm* — Harness, Dickey & Pierce, P.L.C.

(57) ABSTRACT

A scheduling method includes calculating required performance for a given task, calculating use performance and real performance of a candidate processor, calculating power corresponding to the real performance, calculating expected energy usage of the candidate processor based on the required performance, the use performance, the real performance, and the calculated power and calculating performance efficiency of the candidate processor by considering a ratio of the expected energy usage to the real performance.

20 Claims, 5 Drawing Sheets

(56) References Cited

U.S. PATENT DOCUMENTS

| | | | |
|---|---|---|---|
| 2015/0020078 A1* | 1/2015 | Kuesel | G06F 9/4881 718/105 |
| 2015/0178138 A1* | 6/2015 | Saha | G06F 30/20 718/104 |
| 2015/0277988 A1* | 10/2015 | Watanabe | G06F 9/4887 718/104 |
| 2015/0286262 A1* | 10/2015 | Park | G06F 11/3058 713/320 |
| 2016/0139655 A1* | 5/2016 | Chen | G06F 1/324 713/324 |
| 2017/0255239 A1* | 9/2017 | Matteson | G06F 9/5094 |
| 2017/0266535 A1* | 9/2017 | Watterson | A63B 22/0242 |
| 2017/0289000 A1* | 10/2017 | Park | G06F 11/3058 |
| 2018/0088985 A1 | 3/2018 | Blaine et al. | |
| 2018/0101416 A1* | 4/2018 | Fu | G06F 9/5027 |
| 2019/0042280 A1* | 2/2019 | Shanbhogue | G06F 11/3024 |
| 2020/0142754 A1* | 5/2020 | Park | G06F 9/4856 |
| 2020/0310872 A1* | 10/2020 | Jambur Sathyanarayana | G06F 1/324 |
| 2021/0303054 A1* | 9/2021 | Zhu | G06F 1/329 |

\* cited by examiner

| PERFORMANCE | POWER |
|---|---|
| 250 | 1300 |
| 200 | 1000 |
| 150 | 700 |
| 100 | 500 |
| 50 | 400 |

SCHEDULING TASKS BASED ON CALCULATED PROCESSOR PERFORMANCE EFFICIENCIES

This application claims the benefit of Korean Patent Application No. 10-2019-0094799, filed on Aug. 5, 2019, in the Korean Intellectual Property Office, the disclosure of which is incorporated herein in its entirety by reference.

BACKGROUND

1. Technical Field

The present disclosure relates to a scheduling method and device based on performance efficiency and a computer-readable storage medium.

2. Description of the Related Art

A best effort scheduling (BES) method assigns a given task to hardware resources (i.e., processors) capable of processing the task according to required performance for the task. The BES method is suitable for alternating current (AC)-powered devices such as servers and desktop computers and is based on the assumption that energy supply for resource use is infinite. The BES method may not appropriate for mobile devices that receive energy from batteries. This is because battery time is an important factor along with performance.

On the other hand, an energy aware scheduling (EAS) method assigns a task to a processor that consumes the lowest power among processors satisfying required performance for the task. The EAS method aims to reduce (or, alternatively, minimize) energy use without a reduction in performance. The EAS method is based on the premise that all processors satisfying required performance for a task provide the same performance. However, since processors are actually different in performance, task assignment using the EAS method may not be completely effective.

SUMMARY

Example embodiments of the present disclosure provide a scheduling method based on performance efficiency.

Example embodiments of the present disclosure also provide a scheduling device based on performance efficiency.

Example embodiments of the present disclosure also provide a computer-readable storage medium which stores a computer program product for performing scheduling based on performance efficiency.

However, example embodiments of the present disclosure are not restricted to the one set forth herein. The above and other aspects of the present disclosure will become more apparent to one of ordinary skill in the art to which the present disclosure pertains by referencing the detailed description of the present disclosure given below.

According to an example embodiment of the present disclosure, there is provided a method of scheduling a task, the method including calculating a required performance for the task; calculating a use performance and a real performance of a respective candidate processor among a plurality of candidate processors; calculating a power corresponding to the real performance; calculating expected energy usage of the respective candidate processor based on the required performance, the use performance, the real performance, and the power corresponding to the real performance; calculating performance efficiency of the respective candidate processor based on the expected energy usage and the real performance; and scheduling the task to one of the plurality of candidate processors based on the performance efficiency.

According to another example embodiment of the present disclosure, there is provided a method of scheduling a task to one of first through n-th candidate processors, wherein n is a natural number of 2 or more, the method including calculating first through n-th performance efficiencies of the first through n-th candidate processors capable of processing the task, respectively; and assigning the task to a k-th candidate processor of the first through n-th candidate processors based on the first through n-th performance efficiencies, wherein k is a natural number satisfying $1 \le k \le n$.

According to other example embodiments of the present disclosure, there is provided a scheduling device including a memory storing computer readable instructions; and processing circuitry configured to execute the computer readable instructions to, calculate required performance for a task, calculate use performance and real performance of a respective candidate processor among a plurality of candidate processors, calculate power corresponding to the real performance, calculate performance efficiency of the respective candidate processor based on an expected energy usage and the real performance, the expected energy usage being based on the required performance, the use performance, the real performance, and the power corresponding to the real performance, and schedule the task to one of the plurality of candidate processors based on the performance efficiency.

According to other example embodiments of the present disclosure, there is provided a non-transitory computer-readable storage medium which stores a computing program product that, when executed by a computing device, configures the computing device to, calculate required performance for a task; calculate use performance and real performance of a respective candidate processor among a plurality of candidate processors; calculate power corresponding to the real performance; calculate performance efficiency of the respective candidate processor based on expected energy usage and the real performance, the expected energy usage being based on the required performance, the use performance, the real performance, and the power corresponding to the real performance; and schedule the task to one of the plurality of candidate processors based on the performance efficiency.

According to other example embodiments of the present disclosure, there is provided at least one computing program product which is stored in at least one computer-readable storage medium and executed by a computing device, the at least one computing program product comprising: an instruction for calculating required performance for a given task, an instruction for calculating use performance and real performance of a candidate processor, an instruction for calculating power corresponding to the real performance and an instruction for calculating performance efficiency of the candidate processor by considering a ratio of expected energy usage to the real performance, wherein the expected energy usage is a value calculated based on the required performance, the use performance, the real performance, and the calculated power.

However, example embodiments of the present inventive concepts are not restricted to the one set forth herein. The above and other example embodiments of the present inventive concepts will become more apparent to one of ordinary skill in the art to which the present inventive concepts pertain by referencing the detailed description of the present inventive concepts given below.

BRIEF DESCRIPTION OF THE DRAWINGS

These and/or other aspects will become apparent and more readily appreciated from the following description of the example embodiments, taken in conjunction with the accompanying drawings in which.

DETAILED DESCRIPTION

Hereinafter, various example embodiments of the present disclosure will be described with reference to the attached drawings.

Figure 1:
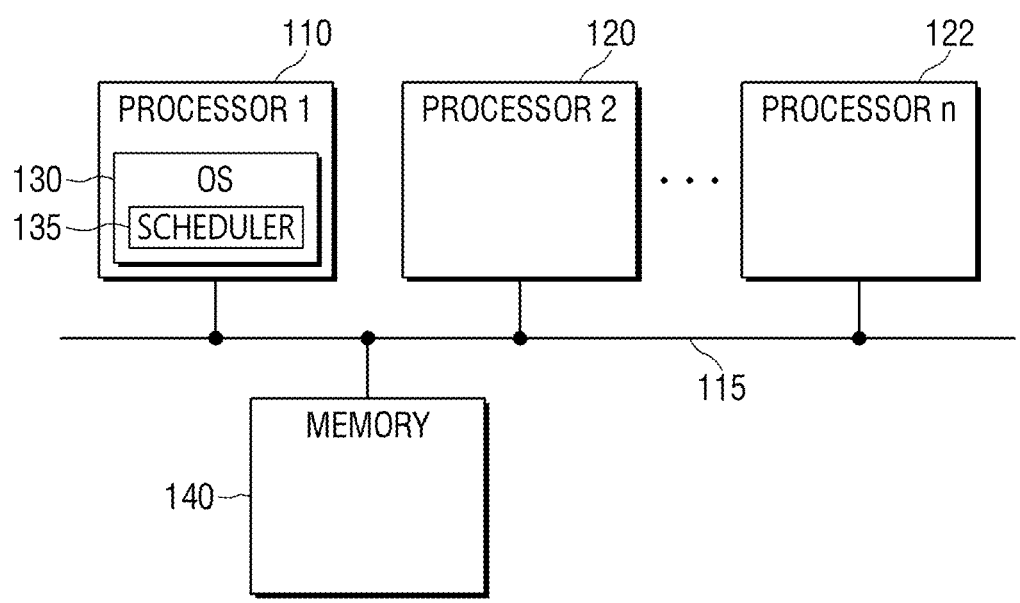
FIG. 1 is a block diagram of a computing device to which a scheduling method according to example embodiments is applied.

FIG. 1 is a block diagram of a computing device to which a scheduling method according to example embodiments is applied.

Referring to FIG. 1, the computing device to which the scheduling method according to the example embodiments are applied includes a plurality of processors 110, 120, 122, a memory 140, and the like. In FIG. 1, the processors 110, 120, 122, the memory 140, and the like are connected through a bus 115. However, example embodiments are not limited to this case. A known or specialized technology may also be used to connect the processors 110, 120, 122 within a system.

Each of the processors 110, 120, 122 may include an operating system (OS) 130. At least one of the processors 110, 120 and 122 may execute a scheduler 135 included in the OS for assigning a given task to at least one of the processors 110, 120, 122. For example, the scheduler 135 selects one of the processors 110, 120, 122 for each task and starts routing each task to the selected processor The scheduler 135 may be, but is not limited to, a software program operating in the context of the OS 130 that, when executed, configures a respective one of the processors 110, 120, 122 as a special purpose computer. The scheduler 135 may be loaded and operated from the memory 140 connected to the processor 110 (each of the processors 110, 120, 122). In addition, the memory 140 may store information related to various processors 110, 120, 122 located in the system. The memory 140 may be implemented as a volatile memory such as a dynamic random access memory (DRAM) or a static RAM (SRAM) or may be implemented as a nonvolatile memory such as a flash memory, a phase-change RAM (PRAM), a resistive RAM (RRAM), a ferroelectric RAM (FRAM), or a magnetic RAM (MRAM).

The scheduler 135 is a module that, when loaded on a respective one of the processors 110, 120, 122, configures the respective one of the processors 110, 120 and 122 to execute the scheduling method according to the example embodiments. As such, below references to the scheduler 135 performing various functions may be performed by the respective one of the processors 110, 120, 122, operating as a special purpose computer to perform said functions.

The scheduler 135 calculates required performance for a given task, calculates use performance and real performance of a candidate processor, calculates power corresponding to the real performance, calculates expected energy usage of the candidate processor based on the required performance, the use performance, the real performance and the calculated power, and calculates performance efficiency of the candidate processor by considering a ratio of the expected energy usage to the real performance. That is, the scheduler 135 calculates performance efficiencies of a plurality of candidate processors for a given task and assigns the task to any one of the candidate processors based on the calculated performance efficiencies. The detailed scheduling method will be described later with reference to FIGS. 2 through 6.

Figure 2:
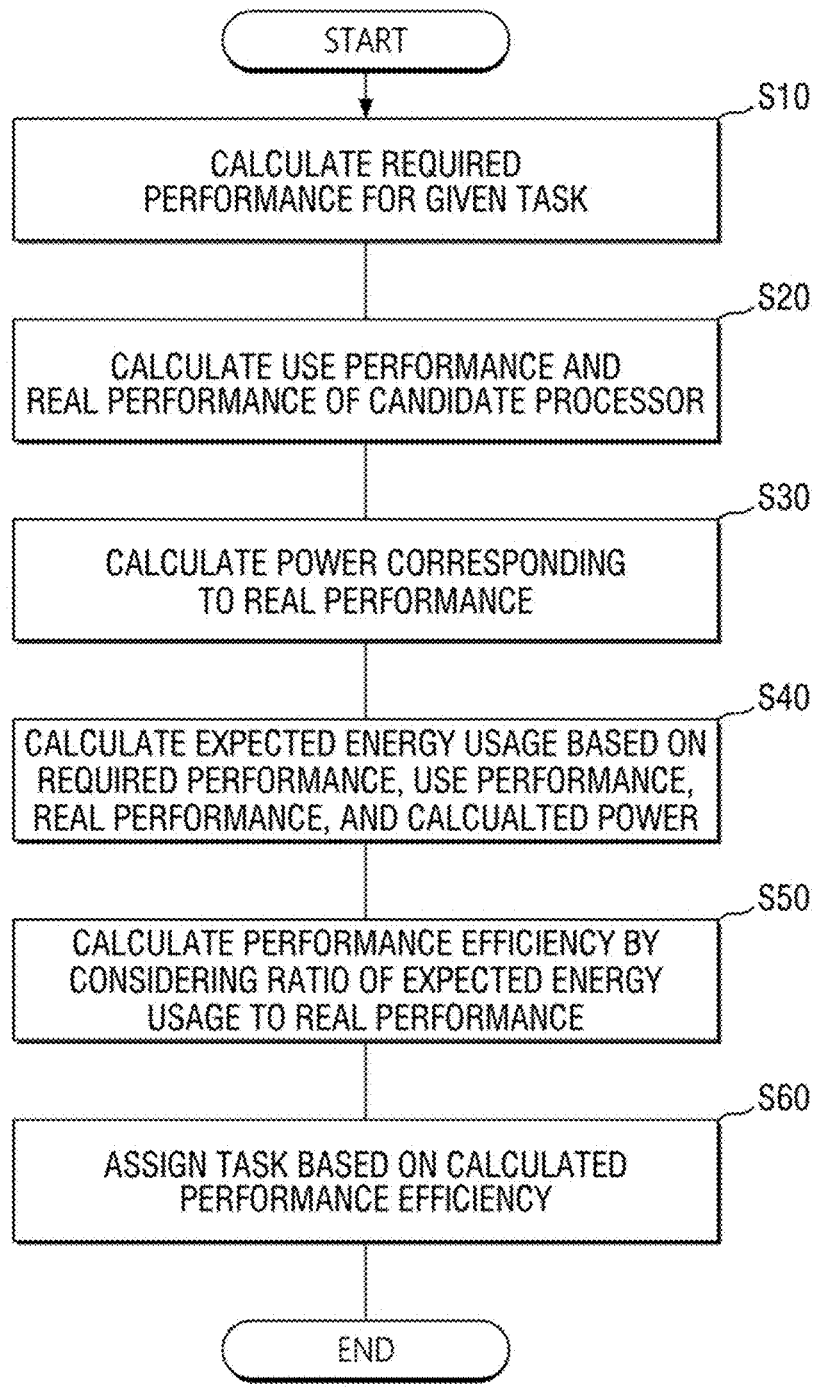
FIG. 2 is a flowchart illustrating a scheduling method according to an example embodiment.
Figures 3, 4:
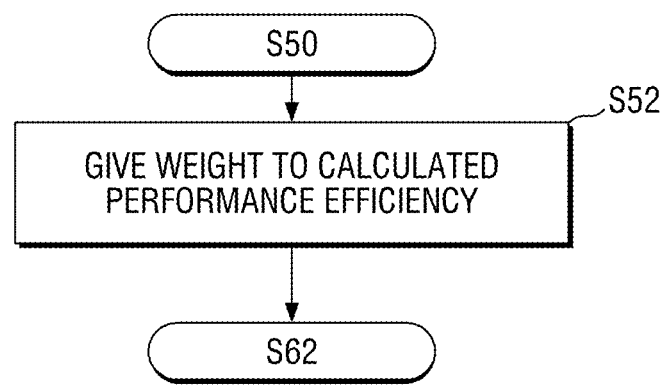
FIG. 3 is a flowchart illustrating a scheduling method according to an example embodiment.
FIG. 4 is an example table summarizing real performance of a processor and power corresponding to the real performance.
Figure 5:
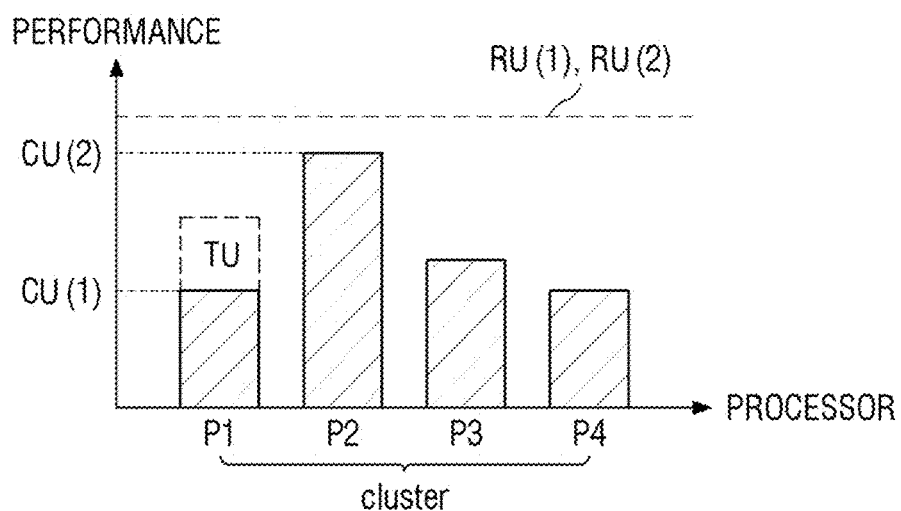
FIG. 5 is a diagram for explaining a plurality of clustered processors.
Figure 6:
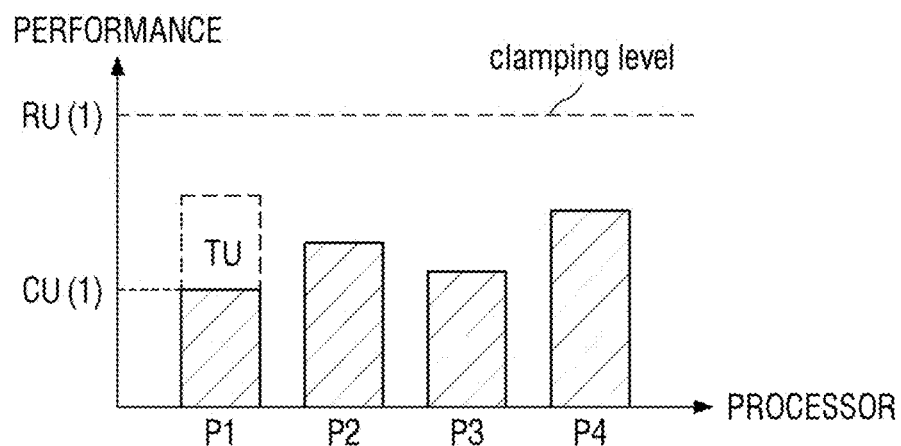
FIG. 6 is a diagram for explaining a plurality of processors having clamped real performances.

FIG. 2 is a flowchart illustrating a scheduling method according to an example embodiment. The scheduling method according to the embodiment is a performance efficiency scheduling (PES) method which is a scheduling method based on performance efficiency. FIG. 4 is an example table summarizing real performance of a processor and power corresponding to the real performance. FIG. 5 is a diagram for explaining a plurality of clustered processors. FIG. 6 is a diagram for explaining a plurality of processors having clamped real performances.

First, referring to FIG. 2, in operation S10, the scheduler 135 calculates required performance for a given task. Specifically, the scheduler 135 may calculate the required performance for the given task as an average using historical data. For example, a historical averaging function provided by the operating system 130, such as LINUX, may be used. For example, if a performance of 30 on average was required to perform the given task according to the historical data, the required performance for the given task is calculated to be 30.

If the given task does not exist in the history, the scheduler 135 may calculate the required performance for the given task with reference to the history of a similar task. For example, if a performance of 30 on average was required to perform a similar task according to the historical data, the required performance for the given task may be calculated to be 30. Alternatively, if required performances for similar tasks were 20, 30 and 40, the required performance for the given task may be calculated to be 30 (=(20+30+40)/3).

In operation S20, the scheduler 135 may calculate use performance and real performance of a candidate processor.

Specifically, the scheduler 135 calculates the real performance (actual performance) of the candidate processor. Here, the real performance may denote performance set in the processor at the time of scheduling. In other words, the real performance denotes maximum performance of the processor at the time of scheduling at a frequency set in the processor. Specifically, the real performance of the processor may be determined by the frequency set in the processor. The higher the set frequency, the higher the real performance of the processor. Conversely, the lower the set frequency, the lower the real performance of the processor. By setting the frequency to be used by the processor, it is possible to determine the real performance of the processor.

In addition, the scheduler 135 calculates the use performance of the candidate processor. Here, the use performance denotes performance required for the processor to perform a basic operation and/or a currently assigned task. The use performance may also be referred to as the required performance of the processor.

For example, when the real performance of the candidate processor is 100, the use performance of the candidate processor is 100 or less because 100 indicates the maximum performance at the set frequency.

The real performance of the processor may be selected and set from several desired (or, alternatively, preset) levels. For example, the real performance may be selected from five desired (or, alternatively, preset) levels of 50, 100, 150, 200 and 250 (see FIG. 4). For example, when the performance required by the processor (e.g., the sum of the use performance of the processor and the required performance for the given task) is 160, 200 may be selected as the real performance, instead of 160. This is because 160 is not included in the preset levels. For example, the real performance of the processor may be controlled using a dynamic voltage frequency scaling (DVFS) method. Here, DVFS levels may be non-successive (discrete).

Here, referring to FIG. 5, the x axis represents a processor, and the y axis represents performance. In FIG. 5, the use performance of each of a plurality of processors P1 through P4 is illustrated (see hatched portions). The processors P1 through P4 form a cluster. For example, use performance CU(1) of the processor P1 is lower than use performance CU(2) of the processor P2.

FIG. 5 also illustrates a dotted line illustrating the real performance RU(1) of the processor P1 and the real performance RU(2) of the processor P2, which are equal to each other and greater than the use performance CU(1) and CU(2). That is, the real performance RU(1) of the processor P1 does not need to be set this high, considering the use performance CU(1) of the processor P1. However, when a plurality of processors P1 through P4 form a cluster, the real performance may be controlled for the cluster (not for each individual processor). In the DVFS method described above, the real performance may also be controlled for each cluster. For example, the real performance may be set based on a processor having a highest load in the cluster. That is, since the processor P2 has the highest load (i.e., the highest use performance CU(2)), the real performances of all processors P1 through P4 belonging to the cluster are set based on the processor P2. Therefore, the real performance RU(1) of the processor P1 is set equal to the real performance RU(2) of the processor P2. That is, when there is a severe load imbalance in the cluster, a gap between the real performance RU(1) and the use performance CU(1) of some processors (e.g., P1) may be large. In this case, even if required performance TU for a task is added to the use performance CU(1), the real performance RU(1) does not change.

In addition, referring to FIG. 6, the x axis represents a processor, and the y axis represents performance. In FIG. 6, the use performance of each of a plurality of processors P1 through P4 is illustrated (see hatched portions). For example, in order to improve the performance felt by a user, each of the processors P1 through P4 may be clamped to a real performance far higher than its use performance. As illustrated in the drawing, for example, the use performance CU(1) of the processor P1 is low, but the real performance RU(1) is set to a high clamping level. In this case, since the processor P1 operates at a high frequency corresponding to the real performance RU(1), the operating speed of the processor P1 is high (although the energy used by the processor P1 is large). Accordingly, the performance felt by the user is high. In this case, even if the required performance TU for a task is added to the use performance CU(1), the real performance RU(1) does not change.

Next, referring again to FIG. 2, in operation S30, the scheduler 135 may calculate power corresponding to the real performance.

Specifically, the scheduler 135 may calculate the power corresponding to the real performance by using a table (see FIG. 4) showing the relationship between the performance and the power. The power may be calculated on average using the previous history. Alternatively, the power may be calculated using an equation that reflects the set frequency and architecture (e.g., cache size, pipeline configuration, etc.) of the processor. Alternatively, the power may be calculated to use a program (e.g., a benchmark program or Dhrystone) that uses the maximum performance of the processor.

As illustrated in FIG. 4, when the performance is 50, 100, 150, 200 and 250, the power may be 400, 500, 700, 1000, and 1300, respectively. To calculate the power, a method other than the method using a table can also be used.

Next, in operation S40, the scheduler 135 may calculate expected energy usage of the candidate processor based on the required performance, the use performance, the real performance, and the calculated power.

Specifically, the expected energy usage may be proportional to the required performance, the use performance and the power and may be inversely proportional to the real performance.

When $EE(1)$, $CU(1)$ and $RU(1)$ are expected energy usage, use performance and real performance of a candidate processor (e.g., P1), respectively, when $RP(1)$ is power corresponding to the real performance of the candidate processor P1, and when TU is required performance for a given task, the expected energy usage $EE(1)$ may be calculated by Equation 1 below. Equation 1 is only an example, and the scope of rights is not limited to this example.

$$EE(1)=(TU+CU(1))\times RP(1)/RU(1) \quad (1).$$

For example, when the use performance $CU(1)$ of the candidate processor P1 is 160, the real performance $RU(1)$ is 200, power corresponding to 200, which is the real performance $RU(1)$, is 1000, and the required performance TU for the given task is 30, the scheduler 135 may calculate the expected energy usage $EE(1)$ as 950.

$$EE(1)=(30+160)\times 1000/200=950$$

Next, in operation S50, the scheduler 135 may calculate performance efficiency of the candidate processor in consideration of a ratio of the expected energy usage to the real performance.

Specifically, the performance efficiency of the candidate processor is a value obtained by dividing the real performance by the expected energy usage and denotes the maximum performance that can be achieved for the energy consumed. That is, the performance efficiency denotes the maximum performance that can be achieved per unit energy.

When $PE(1)$, $EE(1)$ and $RU(1)$ are performance efficiency, expected energy usage and real performance of a candidate processor (e.g., P1), the performance efficiency $PE(1)$ may be calculated by Equation 2 below. The performance efficiency $PE(1)$ is proportional to the square of the real performance RU(1) and inversely proportional to the use performance CU(1).

$$PE(1) = RU(1)/EE(1) \quad (2)$$
$$= RU(1)/\{(TU + CU(1)) \times RP(1)/RU(1)\}$$
$$= RU(1)^2/\{(TU + CU(1)) \times RP(1)\}.$$

For example, when the real performance RU(1) of the candidate processor P1 is 200 and the expected energy usage EE(1) is 950, the scheduler 135 may calculate the performance efficiency PE(1) as about 0.210.

$$EE(1)=200/950=0.210$$

Next, in operation S60, the scheduler 135 may assign the task based on the calculated performance efficiency.

Specifically, when there are n candidate processors, the scheduler 135 calculates the performance efficiency of each of the n candidate processors and assigns the task to a candidate processor with the highest performance efficiency.

In summary, the scheduler 135 calculates first through $n^{th}$ (where n is a natural number of 2 or more) performance efficiencies of first through $n^{th}$ candidate processors capable of processing a given task. Here, a $k^{th}$ (where k is a natural number satisfying 1≤k≤n) performance efficiency denotes the performance efficiency of a $k^{th}$ candidate processor. When PE(k), EE(k), CU(k) and RU(k) are performance efficiency, expected energy usage, use performance and real performance of the $k^{th}$ candidate processor, respectively, when RP(k) is power corresponding to the real performance of the $k^{th}$ candidate processor, and when TU is required performance for the given task, the expected energy usage EE(k) and the performance efficiency PE(k) are determined by Equation 3.

$$EE(k) = (TU + CU(k)) \times RP(k)/RU(k) \quad (3)$$
$$PE(k) = RU(k)/EE(k)$$
$$= RU(k)^2/\{(TU + CU(k)) \times RP(k)\}.$$

The scheduler 135 assigns the task to a candidate processor corresponding to the highest performance efficiency among the calculated first through $n^{th}$ performance efficiencies.

The performance efficiency scheduling method (PES method) according to example embodiments will now be described in more detail using an example. A process of assigning a task to any one of a first candidate processor and a second candidate processor will be described.

It is assumed that the required performance TU for a task is 35, the use performance CU(1) of the first candidate processor is 100, and use performance CU(2) of the second candidate processor is 110. However, example embodiments are not limited thereto.

Table 1 shows the relationship between the performance and power of the first candidate processor.

Since, as discussed above, the use performance CU(1) of the first candidate processor is 100, the scheduler 135 may select 140 as real performance RU(1) of the first candidate processor from amongst the desired (or, alternatively, preset) levels of 105 and 140 in Table 1. As such, the scheduler 135 may determine that the required power RP(1) corresponding to the performance 140 is 1000 based on Table 1. Further, since the use performance is 100 and the required performance TU for the task is 35, the scheduler 135 may calculate the sum (use performance+required performance) as 135.

TABLE 1

| Performance | Power |
|---|---|
| 140 | 1000 |
| 105 | 700 |

Table 2 shows the relationship between the performance and power of the second candidate processor.

Since, as discussed above, the use performance CU(2) of the second candidate processor is 110, the scheduler 135 may select 160 as real performance RU(2) of the second candidate processor from amongst the desired (or, alternatively, preset) levels of 130 and 160 in Table 2. As such, the scheduler 135 may determine that the required power RP(2) corresponding to the performance 160 is 1100 based on Table 2.

Further, since the required performance TU for the task is 35, and the scheduler 135 may calculate the sum (use performance+required performance) as 145.

TABLE 2

| Performance | Power |
|---|---|
| 160 | 1100 |
| 130 | 800 |

The scheduler 135 may calculate expected energy usage EE(1) and performance efficiency PE(1) of the first candidate processor as follows.

$$EE(1)=(TU+CU(1))\times RP(1)/RU(1)=(35+100)\times 1000/140=964.2857$$

$$PE(1)=RU(1)/EE(1)=140/964.2857=0.145185$$

The scheduler 135 may calculate expected energy usage EE(2) and performance efficiency PE(2) of the second candidate processor as follows.

$$EE(2)=(TU+CU(2))\times RP(2)/RU(2)=(35+110)\times 1100/160=996.875$$

$$PE(2)=RU(2)/EE(2)=160/996.875=0.160502$$

If the scheduler 135 assigns the task based on the minimum expected energy usage, the task will be assigned to the first candidate processor since the expected energy usage EE(1)=964.2857 of the first candidate processor of is smaller than the expected energy usage EE(2)=996.875 of the second candidate processor.

However, if the scheduler 135 assigns the task based on the maximum performance efficiency, the task will be assigned to the second candidate processor since the performance efficiency PE(2)=0.160502 of the second candidate processor is greater than the performance efficiency PE(1)=0.145185 of the first candidate processor.

The scheduling method according to example embodiments may exhibit a more maximized effect when a task is assigned in the following cases. The following cases are cases where a plurality of candidate processors capable of processing a task do not provide the same performance. Since the scheduling method according to example embodiments calculates performance efficiency by considering not only use performance CU but also real performance RU and power RP corresponding to the real performance, more efficient and accurate task assignment is possible even in the following cases.

A first case is a case where a plurality of processors operating at different non-successive DVFS levels constitute a system. As in the above example, this is a case where the scheduler 135 controls the first candidate processor at a DVFS level of Table 1, and the second candidate processor at a DVFS level of Table 2. For example, even if the sum of the use performance of the first candidate processor and the required performance for the task is equal (e.g., 140) to the sum of the use performance of the second candidate processor and the required performance for the task, the scheduler 135 should control the DVFS level (real performance) of the first candidate processor at 140, and the DVFS level (real performance) of the second candidate processor at 160.

A second case is a case where a plurality of processors P1 through P4 form a cluster and there is a severe load imbalance in the cluster as described using FIG. 5. In this case, the scheduler 135 may set the real performances of all processors P1 through P4 based on a processor having a highest load in the cluster. Since the processor P2 has the highest load (i.e., the highest use performance CU(2)), the scheduler 135 sets the real performances of all processors P1 through P4 belonging to the cluster based on the processor P2. Therefore, the scheduler 135 sets the real performance RU(1) of the processor P1 to the real performance RU(2) of the processor P2. Accordingly, a gap between the real performance RU(1) and the use performance CU(1) of the processor (e.g., P1) may be large.

A third case is a case where each of the processors P1 through P4 is clamped to a real performance far higher than its use performance in order to improve the performance felt by a user, as described using FIG. 6. Although the use performance CU(1) of the processor P1 is low, the scheduler 135 sets the real performance RU(1) to a high clamping level.

A fourth case is a case where a plurality of different types of (i.e., heterogeneous) processors constitute a system or a case where a plurality of processors having different architectures even if they are of the same type (i.e., homogeneous) constitute a system. Different architectures denote different cache sizes and pipeline configurations. For example, if a processor has a larger cache size or a more appropriate pipeline configuration than other processors of the same type as the processor, it may exhibit substantially higher performance.

As described above, when there is a difference in performance between a plurality of candidate processors capable of processing a task, the scheduler 135 may assign the task to a processor having the highest maximum performance per unit energy, as in the scheduling method according to example embodiments.

FIG. 3 is a flowchart illustrating a scheduling method according to an example embodiment. For ease of description, differences from elements and features described using FIGS. 1 and 2 will be mainly described below.

Referring to FIG. 3, in operation S52, which may occur between operation S50 and operation S60, the scheduler 135 may assign a weight to the performance efficiency calculated in operation S50.

That is, when PE(k), w(k) and EE(k) are performance efficiency, a weight, and expected energy usage of a $k^{th}$ candidate processor, the scheduler 135 may calculate the performance efficiency PE(k) based on Equation 4.

$$PE(k)=w(k) \times RU(k)/EE(k) \qquad (4).$$

The weight w(k) may be factored in for the following reasons. Real performance and power corresponding to the real performance are calculated using a table (e.g., the table of FIG. 4). However, information provided in the table may not represent all real situations. The table of FIG. 4 may be created based on a program (e.g., a benchmark program or Dhrystone) that uses the maximum performance of a processor as described above. However, the processor is not 100% utilized in a typical user scenario (UX, games, etc.). Therefore, the table may not accurately reflect the typical user scenario. Therefore, in one or more example embodiments, the reduction in accuracy can be compensated for by using the weight w(k). In addition, user satisfaction can be increased by intentionally using a different weight for performance/power consumption according to scenario.

As described above, the $k^{th}$ candidate processor may correspond to the following cases.

The $k^{th}$ candidate processor and a first processor may form a cluster, use performance of the first processor may be set higher than use performance of the $k^{th}$ candidate processor, and real performance of the first processor may be set higher than the use performance of the first processor. Here, real performance of the $k^{th}$ candidate processor may be set equal to the real performance of the first processor.

Alternatively, the $k^{th}$ candidate processor may be clamped. Considering the use performance of the $k^{th}$ candidate processor, a first level of real performance may be sufficient. However, the $k^{th}$ candidate processor may be set to a second level of real performance higher than the first level. Here, the first level and the second level may be levels selected from preset levels.

Alternatively, the $k^{th}$ candidate processor may be controlled at a non-successive DVFS level. That is, the real performance of the $k^{th}$ candidate processor may be selected and set from several preset levels.

Alternatively, a plurality of candidate processors may include the $k^{th}$ candidate processor and an $m^{th}$ candidate processor (where m is a natural number different from k and satisfying $1 \leq m \leq n$), and the $k^{th}$ candidate processor and the $m^{th}$ candidate processor may be heterogeneous or may have different architectures even if they are homogeneous.

Figure 7:
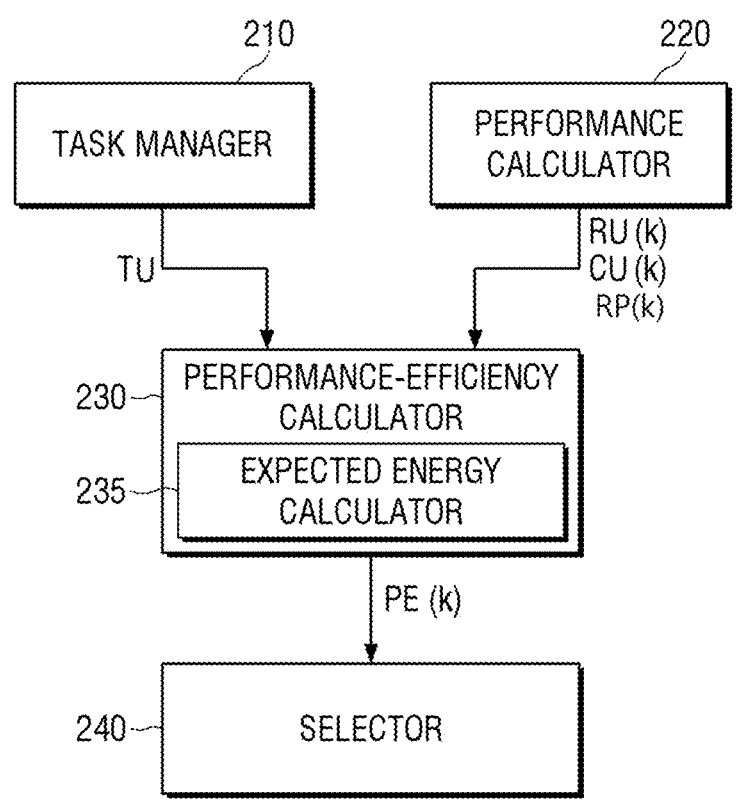
FIG. 7 illustrates a scheduling device according to example embodiments.

FIG. 7 illustrates a scheduling device according to example embodiments. FIG. 7 is a block diagram illustrating an example configuration of the scheduler 135 of FIG. 1. For ease of description, a description of elements and features described using FIGS. 1 through 6 will be omitted.

Referring to FIG. 7, a respective one of the processors 110, 120, 122 may execute software that configures the respective one of the processors 110, 120 122 to operate as a special purpose computer to perform the functions of a scheduling device including a task manager 210, a performance calculator 220, a performance efficiency calculator 230, and a selector 240.

Specifically, the task manager 210 calculates required performance TU for a given task.

The performance calculator 220 calculates use performance CU(k) and real performance RU(k) of a candidate processor and calculates power RP(k) corresponding to the real performance RU(k).

The performance efficiency calculator 230 calculates performance efficiency PE(k) of each of a plurality of candidates. The performance efficiency calculator 230 calculates the performance efficiency PE(k) of each of the candidate processors by considering a ratio of expected energy usage EE(k) to the real performance RU(k). Here, the expected energy usage EE(k) may be a value calculated based on the required performance TU, the use performance CU(k), the real performance (RU(k), and the calculated power RP(k).

The expected energy usage EE(k) may be proportional to the required performance TU, the use performance CU(k) and the power RP(k) and may be inversely proportional to the real performance RU(k). The performance efficiency PE(k) may be proportional to the square of the real performance RU(k) and inversely proportional to the use performance CU(k). For example, the expected energy usage EE(k) and the performance efficiency PE(k) may be as defined in Equation 3. Additionally, the performance efficiency calculator 230 may give a weight w(k) to the calculated performance efficiency PE(k).

The selector 240 assigns the task to a candidate processor having the highest performance efficiency, and, thereafter, the candidate processor executes the assigned task.

The scheduling method described using FIGS. 1 through 6 may be implemented as a non-transitory computer-readable storage medium that stores computing program product executed by a computing device.

The computer program product may include an instruction for calculating required performance for a given task, an instruction for calculating use performance and real performance of a candidate processor, an instruction for calculating power corresponding to the real performance, and an instruction for calculating performance efficiency of the candidate processor by considering a ratio of expected energy usage to the real performance, wherein the expected energy usage is a value calculated based on the required performance, the use performance, the real performance, and the calculated power.

The computing device may include at least one of, for example, desktop personal computers (PCs), laptop PCs, netbook computers, workstations, personal digital assistants (PDAs), portable multimedia players (PMPs), smartphones, tablet PCs, mobile phones, video phones, electronic book readers, MP3 players, medical devices, cameras, and wearable devices. Here, the wearable devices may include at least one of accessory type wearable devices (e.g., watches, rings, bracelets, anklets, necklaces, glasses, contact lenses, and head-mounted-devices (HMDs)), fabric/clothing-integrated type wearable devices (e.g., electronic apparel), body-attached type wearable devices (e.g., skin pads and tattoos), and body-implantable circuits. In some embodiments, the computing device may include at least one of, for example, televisions (TVs), digital video disk (DVD) players, audio players, refrigerators, air conditioners, cleaners, ovens, microwave ovens, washing machines, air cleaners, set-top boxes, home automation control panels, security control panels, media boxes (e.g., Samsung HomeSync™, Apple TV™, and Google TV™), game consoles (e.g., Xbox™ and PlayStation™), electronic dictionaries, electronic keys, camcorders, and electronic picture frames.

In other example embodiments, the computing device may include at least one of various medical devices (e.g., various portable medical measurement devices (such as blood glucose meters, heart rate meters, blood pressure meters, and thermometers), magnetic resonance angiography (MRA) devices, magnetic resonance imaging (MRI) devices, computed tomography (CT) devices, scanners, and ultrasonic devices), navigation devices, global navigation satellite systems (GNSSs), event data recorders (EDRs), flight data recorders (FDRs), vehicle infotainment devices, electronic equipment for vessels (e.g., vessel navigation systems and gyrocompasses), avionics, security devices, vehicle head units, industrial or home robots, automatic teller machines (ATMs) of financial institutions, point of sales (POS) devices of stores, and Internet of Things (IoT) devices (e.g., light bulbs, various sensors, sprinklers, fire alarms, thermostats, streetlamps, toasters, exercise equipment, hot water tanks, heaters, and boilers). According to an example embodiment, the electronic device may include at least one of parts of furniture, buildings/structures or vehicles, electronic boards, electronic signature receiving devices, projectors, and various measuring instruments (e.g., water meters, electricity meters, gas meters, and radio wave meters). In various example embodiments, the electronic device may be flexible or may be a combination of two or more of the above-mentioned devices.

The computer-readable storage medium may be a hard disk, a floppy disk, a magnetic medium (e.g., a magnetic tape), an optical recording medium (e.g., a compact disk read-only memory (CD-ROM) or a DVD), or a magneto-optical medium (e.g., a floptical disk). In addition, the computer-readable storage medium may be a memory including a volatile memory such as a DRAM or an SRAM and/or a nonvolatile memory such as a flash memory, a PRAM, an RRAM, an FRAM, or an MRAM.

The elements described above, such as the scheduler 135 and the modules therein including the task manager 210, the performance calculator 220, the performance-efficiency calculator 230, and the selector 240 may be implemented in processing circuitry such as hardware including logic circuits; a hardware/software combination such as a processor executing software; or a combination thereof and memory. For example, the processing circuitry more specifically may include, but is not limited to, a central processing unit (CPU), an arithmetic logic unit (ALU), a digital signal processor, a microcomputer, a field programmable gate array (FPGA), a programmable logic unit, a microprocessor, application-specific integrated circuit (ASIC), etc. The processing circuitry may be special purpose processing circuitry that more efficiently and accurately assigns tasks based on not only use performance CU but also real performance RU and power RP corresponding to the real performance.

In concluding the detailed description, those skilled in the art will appreciate that many variations and modifications may be made to the preferred embodiments without substantially departing from the principles of the present inventive concepts. Therefore, the disclosed example embodiments of the inventive concepts are used in a generic and descriptive sense only and not for purposes of limitation.

The example embodiments of the present inventive concepts have been described with reference to the attached drawings, but it may be understood by one of ordinary skill in the art that the present inventive concepts may be performed one of ordinary skill in the art in other specific forms without changing the technical concepts or essential features of the present inventive concepts. Further, the above-described example embodiments are merely examples and do not limit the scope of the rights of the present inventive concepts.

What is claimed is:

1. A method of controlling a processor to automatically route a task to one of a plurality of plurality of candidate processors, the method comprising:
   calculating, by the processor, a required performance for the task;
   calculating, by the processor, a use performance and a real performance of a respective candidate processor among the plurality of candidate processors;
   calculating, by the processor, a power corresponding to the real performance;

calculating, by the processor, expected energy usage of the respective candidate processor based on the required performance, the use performance, the real performance, and the power corresponding to the real performance;

calculating, by the processor, performance efficiency of the respective candidate processor based on the expected energy usage and the real performance;

selectively assigning, by the processor, the task to the respective candidate processor based on the performance efficiency of the respective candidate processor meeting the required performance for the task; and automatically routing, by the processor, the task to the assigned processor for the assigned processor to execute the task.

2. The method of claim 1, further comprising:
applying a weight to the performance efficiency to generate a weighted performance efficiency, wherein
the assigning the task includes assigning based on the weighted performance efficiency.

3. The method of claim 1, wherein the assigning includes assigning the task to one of the plurality of candidate processors with a highest performance efficiency.

4. The method of claim 1, wherein the calculating the expected energy usage calculates the expected energy usage such that,
the expected energy usage is proportional to the required performance, the use performance and the power corresponding to the real performance, and
the expected energy usage is inversely proportional to the real performance.

5. The method of claim 1, wherein the calculating the performance efficiency calculates the performance efficiency such that,
the performance efficiency is proportional to a square of the real performance, and
the performance efficiency is inversely proportional to the use performance.

6. The method of claim 1, wherein the plurality of candidate processors include a first candidate processor and a second candidate processor forming a cluster, and the calculating the use performance and the real performance comprise:
setting the use performance of the first candidate processor higher than the use performance of the second candidate processor;
setting the real performance of the first candidate processor higher than the use performance of the first candidate processor; and
setting the real performance of the second candidate processor equal to the real performance of the first candidate processor.

7. The method of claim 1, wherein the calculating the use performance and the real performance comprises:
clamping the real performance of the respective candidate processor to a second level of real performance higher than a first level of real performance although the first level of real performance is sufficient considering the use performance of the respective candidate processor.

8. The method of claim 1, wherein the calculating the use performance and the real performance comprises:
selecting the real performance of the respective candidate processor from among a plurality of preset levels.

9. The method of claim 1, wherein the plurality of candidate processors include a first candidate processor and a second candidate processor, and the first candidate processor and the second candidate processor are heterogeneous or have different architectures.

10. A method of controlling a processor to automatically route a task to one of first through n-th candidate processors, wherein n is a natural number of 2 or more, the method comprising:
calculating, by the processor, first through n-th performance efficiencies of the first through n-th candidate processors capable of processing the task, respectively based on at least a use performance of a respective one of the first through n-th candidate processors, a real performance of the respective one of the first through n-th candidate processors and a power corresponding to the real performance;
assigning, by the processor, the task to a k-th candidate processor of the first through n-th candidate processors based on the first through n-th performance efficiencies and a required performance for the task, wherein k is a natural number satisfying $1 \leq k \leq n$, and wherein the k-th candidate processor has a highest calculated performance efficiency amongst the first through n-th candidate processors; and
automatically routing, by the processor, the task to the assigned processor for the assigned processor to execute the task.

11. The method of claim 10, wherein the calculating comprises:
calculating, for the k-th candidate processor, a k-th performance efficiency based on $PE(k)=w(k) \times Ru(k)/EE(k), EE(k)=(TU+CU(k)) \times RP(k)/RU(k)$, wherein $PE(k)$, $w(k)$, $EE(k)$, $CU(k)$ and $RU(k)$ are performance efficiency, a weight, expected energy usage, the use performance and the real performance of the k-th candidate processor, respectively, $RP(k)$ is the power corresponding to the real performance of the k-th candidate processor, and TU is the required performance for the task.

12. The method of claim 10, wherein the first through n-th candidate processors form a cluster, and the method comprises:
setting the use performance of the first candidate processor higher than the use performance of the k-th candidate processor;
setting the real performance of the first candidate processor higher than the use performance of the first candidate processor; and
setting the real performance of the k-th candidate processor equal to the real performance of the first candidate processor.

13. The method of claim 10, further comprising:
clamping the real performance of the k-th candidate processor to a second level of real performance higher than a first level of real performance although the first level of real performance is sufficient considering the use performance of the k-th candidate processor.

14. The method of claim 10, further comprising:
selecting the real performance of the k-th candidate processor from among a plurality of preset levels.

15. The method of claim 10, wherein the k-th candidate processor and an m-th candidate processor are provided, and the k-th candidate processor and the m-th candidate processor are heterogeneous or have different architectures even if the k-th candidate processor and the m-th candidate processor are homogeneous, wherein m is a natural number different from k and satisfying $1 \leq m \leq n$.

16. A scheduling device comprising:
a memory storing computer readable instructions; and
processing circuitry configured to execute the computer readable instructions to,
  calculate required performance for a task,
  calculate use performance and real performance of a respective candidate processor among a plurality of candidate processors,
  calculate power corresponding to the real performance,
  calculate performance efficiency of the respective candidate processor based on an expected energy usage and the real performance, the expected energy usage being based on the required performance, the use performance, the real performance, and the power corresponding to the real performance,
  selectively assign the task to the respective candidate processor based on the performance efficiency of the respective candidate processor meeting the required performance for the task, and
  automatically route the task to the assigned processor for the assigned processor to execute the task.

17. The scheduling device of claim 16, wherein the processing circuitry is configured to applying a weigh to the performance efficiency to generate a weighted performance efficiency.

18. The scheduling device of claim 16, wherein the processing circuitry is configured to schedule the task by assigning the task to one of the plurality of candidate processors having a highest performance efficiency.

19. The scheduling device of claim 16, wherein the processing circuitry is configured to calculate the expected energy usage such that,
  the expected energy usage is proportional to the required performance, the use performance and the power corresponding to the real performance, and
  the expected energy usage is inversely proportional to the real performance.

20. The scheduling device of claim 16, wherein the processing circuitry is configured to calculate the performance efficiency such that,
  the performance efficiency is proportional to a square of the real performance, and
  the performance efficiency is inversely proportional to the use performance.

* * * * *